(12) United States Patent
Smith et al.

(10) Patent No.: US 11,561,005 B2
(45) Date of Patent: Jan. 24, 2023

(54) MULTI FUEL FLAME-LESS COMBUSTOR

(71) Applicant: Intelligent Power Generation Limited, Greater London (GB)

(72) Inventors: Geoff Smith, Reigate (GB); Tristram Bracey, Hove (GB)

(73) Assignee: Intelligent Power Generation Limited, Greater London (GB)

( * ) Notice: Subject to any disclaimer, the term of this patent is extended or adjusted under 35 U.S.C. 154(b) by 205 days.

(21) Appl. No.: 17/040,401

(22) PCT Filed: Apr. 2, 2019

(86) PCT No.: PCT/GB2019/050952
§ 371 (c)(1),
(2) Date: Sep. 22, 2020

(87) PCT Pub. No.: WO2019/193329
PCT Pub. Date: Oct. 10, 2019

(65) Prior Publication Data
US 2021/0116124 A1    Apr. 22, 2021

(30) Foreign Application Priority Data

Apr. 5, 2018 (GB) .................................. 1805687

(51) Int. Cl.
*F23C 9/00* (2006.01)
*F23C 99/00* (2006.01)
*F23D 11/24* (2006.01)
*F23K 5/02* (2006.01)

(52) U.S. Cl.
CPC .............. *F23C 9/006* (2013.01); *F23C 99/00* (2013.01); *F23C 2900/99001* (2013.01); *F23D 11/24* (2013.01); *F23D 2900/11002* (2013.01); *F23K 5/02* (2013.01); *F23K 2300/20* (2020.05)

(58) Field of Classification Search
CPC ...................... F23C 9/006; F23C 99/00; F23C 2900/99001; F23K 2300/20; F23K 5/02; F23D 11/24; F23D 2900/11002
See application file for complete search history.

(56) References Cited

U.S. PATENT DOCUMENTS 5,154,599 A    10/1992  Wunning

FOREIGN PATENT DOCUMENTS

| CN | 1505744 A | 6/2004 |
|---|---|---|
| CN | 101715529 A | 5/2010 |
| CN | 106458678 A | 2/2017 |
| CN | 107420937 A | 12/2017 |
| RU | 2447364 C2 | 4/2012 |
| WO | 1999018392 | 4/1999 |
| WO | 2007128963 A1 | 11/2007 |

OTHER PUBLICATIONS

PCT/GB2019/050952, International Search Report and Written Opinion, dated Jun. 19, 2019.
PCT/GB2019/050952, Written Opinion, dated Feb. 27, 2020.
PCT/GB2019/050952, International Preliminary Report on Patentability, dated May 8, 2020.
China Patent Application No. 201980022433.8, Office Action, dated Nov. 18, 2022, 17 pgs.

*Primary Examiner* — Alfred Basichas
(74) *Attorney, Agent, or Firm* — Kilpatrick Townsend & Stockton LLP

(57) ABSTRACT

A flameless combustor usable with multiple fuels comprises a combustion chamber and fuel lines in communication with the chamber.

14 Claims, 4 Drawing Sheets

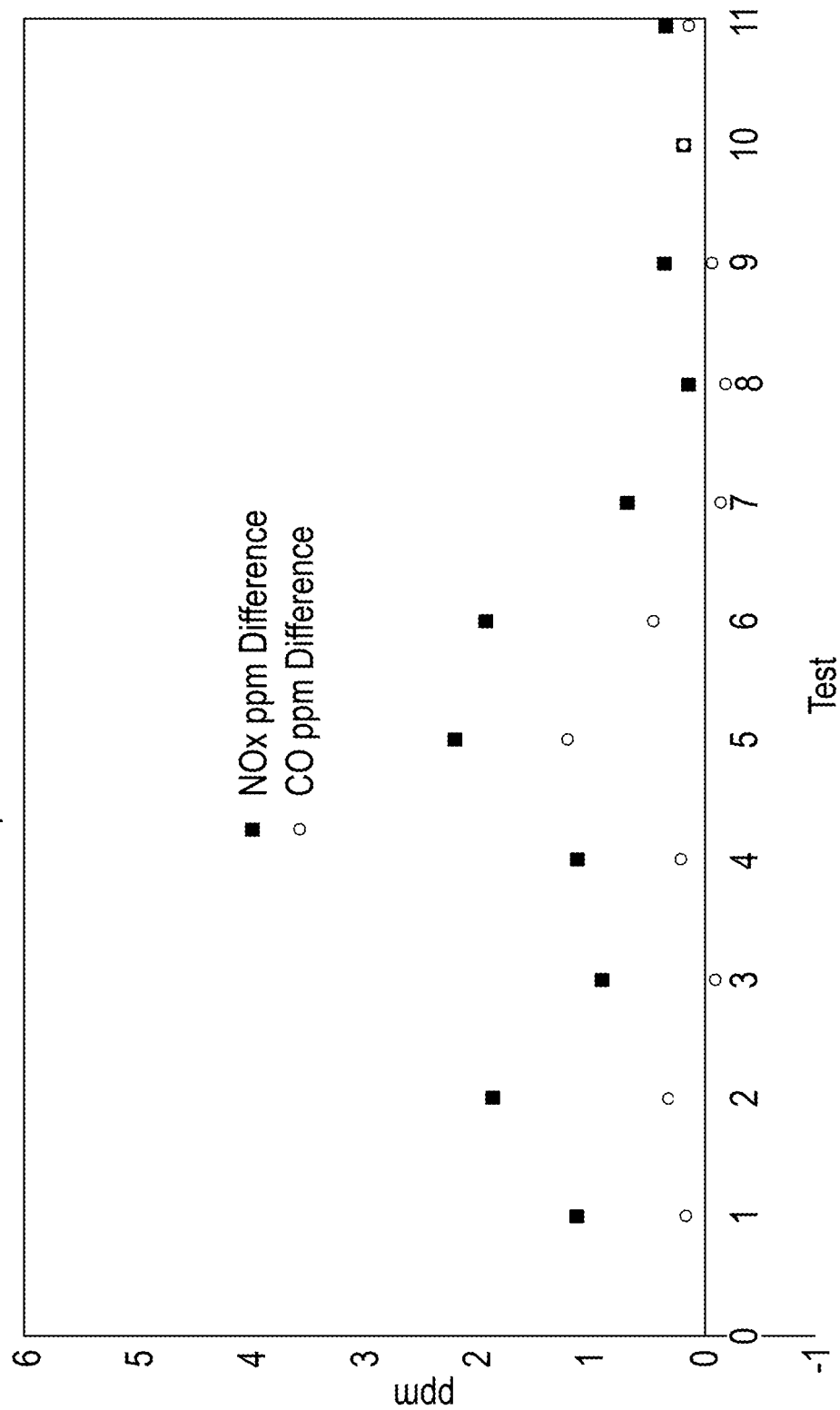

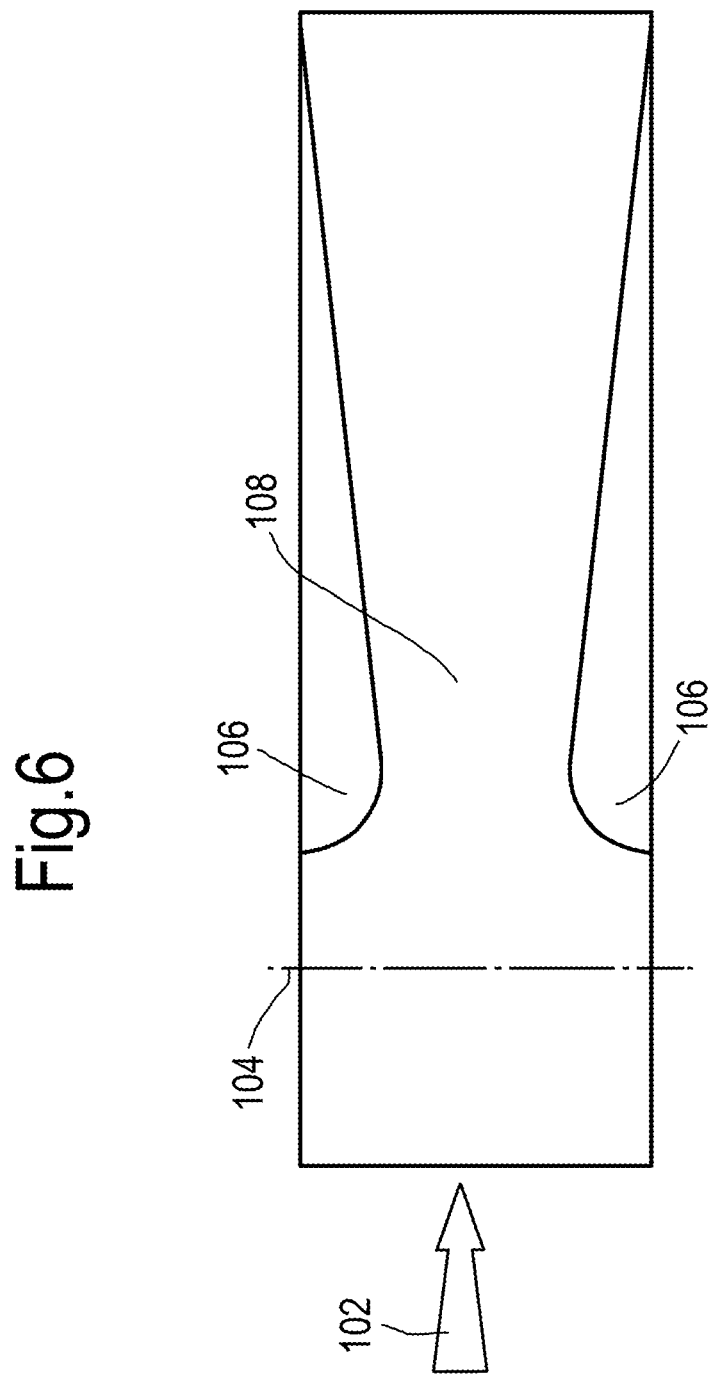

MULTI FUEL FLAME-LESS COMBUSTOR

CROSS-REFERENCE TO RELATED APPLICATIONS

This application is a national phase entry under 35 USC § 371 of International Application PCT/GB2019/050952 ("the '952 application"), filed Apr. 2, 2019, which application claims priority to and benefits of United Kingdom Patent Application No. 1805687.9 ("the '879 application"), filed on Apr. 5, 2018. The '952 application and the '879 application are hereby incorporated in their entireties by this reference.

FIELD OF THE INVENTION

The featured device is a type of combustor for use with multiple fuels.

BACKGROUND

A combustor is a device which ignites and burns a fuel to raise the temperature of a working fluid, ideally with little pressure loss and low formation of undesirable gas species such as carbon monoxide (CO) and mono-nitrogen oxides ($NO_x$).

A flame is a cascading oxidation reaction of a fuel whereby local exothermic heat (from either an ignition source or a prior flame) perpetuates local ignition only. This creates large spatial gradients in properties such as temperature and combustion air-fuel ratio, hence can create more undesirable products than an ideal process. It also requires relatively low velocities of air and/or fuel (typically the order of 5-10 m/s), a large volume of any combustion chamber, and a very careful design to ensure flame stability.

Various forms of 'lameless' combustion abound in the literature under names such as FLOX (flameless oxidation), CDC (colourless distributed combustion), and asymmetric whirl combustion. In all cases, the necessary activation energy for combustion is provided by means other than a conventional flame front; for example, in some designs the combustion gases are greatly recirculated and/or pre-heated. The lack of a flame reduces the temperature peaks associated with $NO_x$ formation and provides an evenly distributed temperature and product distribution, thus reducing CO formation.

Flameless combustion requires a distributed reaction zone (DRZ) such that a flame-front does not occur. In many prior art flameless combustor systems, such as that depicted in U.S. Pat. No. 5,154,599 or in PCT application WO 99/18392, this is conducted by reducing the oxygen concentration through recirculation of flue gases (which may also increase the temperature of the combustion zone to above the point of auto ignition of the fuel) or other means and by increasing gas velocities in the reaction region. The reduction of oxygen reduces the reaction rate and the high gas velocities distribute the reactants sufficiently such that combustion does not occur in the local region of the fuel injector and thus is distributed in such a way to avoid the occurrence of a flame front or the requirement of an ignition source; as a result of the reaction thus taking place slowly over a distributed area, a DRZ is established.

Conventional flame-based combustors typically use their oxidising agent as a coolant to a liner as it bypasses the main reaction zone to be added through dilution holes. In such combustors the liner is typically a thin metal casing separating the combustion zone from dilution air that passes through the liner holes to dilute the combustion gases. Such prior art flame-based combustors cannot accept high temperature oxidising agents, as temperatures within the reaction zone would reach extremely high levels—thus greatly elevating $NO_x$ emissions and because if the oxidising agent is too hot it no longer acts to cool the liner, hence metals would not be suitable for such liner construction. This is a particular problem because the liners typically have a complex geometry so as to incorporate the dilution holes, to an extent where they are often too complex to manufacture from ceramic materials.

Another variety of prior art flameless combustor system is exemplified in PCT application WO 99/18392. In this example there is a cylindrical oxidation chamber, in which oxygen takes place, and within the oxidation chamber and extending along its length is a fuel conduit with a plurality of nozzles, such that fuel is injected into the oxidation chamber to react with oxygen at each of the nozzles along the length of the fuel conduit.

SUMMARY OF THE INVENTION

The present invention is a flameless combustor system comprising a combustion chamber extending longitudinally through which an oxidising agent flows in the longitudinal direction from an inlet to an outlet, and at least two fuel lines, wherein at least one fuel injection pipeline in fluid communication with a first of the at least two fuel lines pipeline extends through the wall of the combustion chamber, and wherein each fuel injection pipeline contains at least one fuel injector for injecting fuel into the combustion chamber.

At least one of the at least one fuel injection pipeline(s) extends through the wall of the combustion chamber, across the interior of the combustion chamber to the opposite wall, and through the opposite wall, such that the fuel injection pipeline is in fluid communication with both the first of the at least two fuel lines and a second of the at least two fuel lines.

Preferably, each of the at least two fuel line(s) has extending from it at least one fuel inlet pipeline in fluid communication with the fuel line and at least one of the at least one fuel injection pipelines extends from the fuel inlet pipeline, such that the fuel injection pipeline is in fluid communication with the fuel inlet pipeline.

Preferably, the at least two fuel lines extend substantially parallel to the combustion chamber in the longitudinal direction. Where this is the case, the at least one fuel injection pipeline(s) preferably extend in a direction perpendicular to that of the at least one fuel line. Where this is the case and fuel inlet pipelines are in use, it is preferable that the fuel inlet pipelines extend in a direction perpendicular to that of the at least one fuel line and of the at least one fuel injection pipeline.

Optionally, each fuel line can have a plurality of fuel inlet pipelines extending from it along its length, and each fuel inlet pipeline can have a plurality of fuel injection pipelines extending from them along their lengths.

Optionally, bracing is used between fuel injection pipelines to manipulate the natural frequency of the pipelines.

Suitable fuel injectors for injecting fuel into the combustion chamber include holes or nozzles. Preferably, the fuel injectors are oriented towards the outlet of the combustion chamber. (As a result of this orientation, fuel will be released into the combustion chamber travelling substantially in the same direction as the oxidising agent.)

Preferably, the diameters of the at least one fuel line, at least one fuel injection line, and (where present) the fuel inlet pipelines are chosen such that under operational conditions the pressure of fuel delivered to each injection point is the same.

Preferably, the fuel injectors are evenly distributed within the combustion chamber.

Systems constructed to the above criteria allow for flameless combustion with high velocity oxidising agent injection and fuel injection. Under preferable configurations, fuel is injected at evenly distributed locations and the pressure of fuel injection at each location is broadly the same.

The invention allows for a controlled, specified air-fuel ratio (AFR) to be maintained locally at each fuel injector. Under preferable operating conditions the local air-fuel ratio is the same at each fuel injection location, with the result being that these local air-fuel ratios are the same as the global air-fuel ratio within the combustor. This ensures perfect mixing of fuel and oxidising agent, thus removing fuel rich and hot zones within the combustor associated with the production of unwanted byproducts, The injection pipelines with their fuel injectors are spread equally throughout the combustor with their positions selected based on oxidising agent mass flow, sized to ensure that the fuel velocity is significantly higher than the oxidising agent velocity.

DESCRIPTION OF FIGURES

FIG. 5 depicts test data derived from a combustor system according to the present invention, indicating an extremely low level of increase in $NO_x$ and CO.

FIG. 6 depicts a combustion chamber compatible with the present invention incorporating a number of optional features.

DETAILED DESCRIPTION

Figure 1:
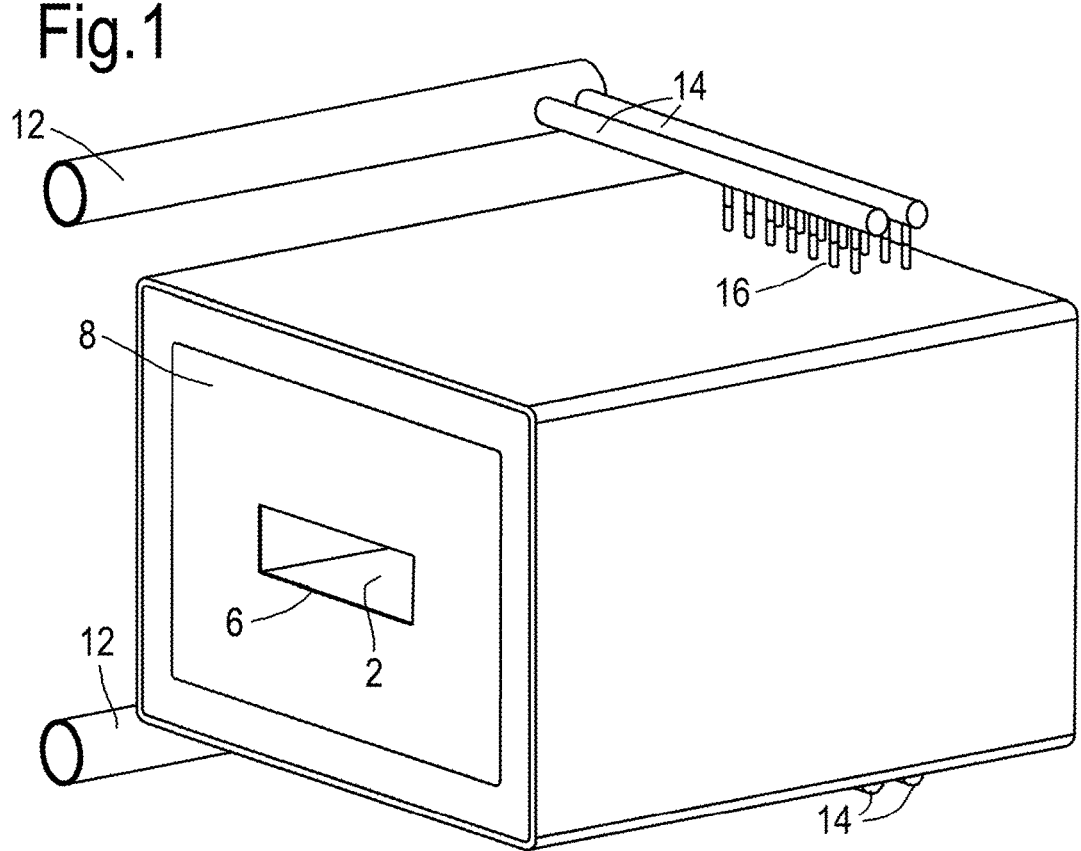
FIGS. 1 and 4 provide a perspective view of a combustor system according to the present invention, including several preferable features.

The combustor may be operated utilising a high temperature oxidising agent, such as recuperated air. Combustion processes within the combustor produce ultra-low levels of $NO_x$ (<5 ppm in the exhaust) and low levels of CO (<6 ppm in the exhaust), thus lessening the need for secondary removal methods. The combustor can use a pressurised fuel and/or a pressurised oxidising agent should the application require it and the mixture of air and fuel may be below the lower explosion limit for the fuel.

As described above, prior art flameless combustors are based on the recirculation of flue gases. The combustor described herein achieves flameless combustion without the requirement of recirculation of flue gases. This allows for the establishment of a DRZ without reducing the oxygen concentration within the reaction zone.

In examples of the present invention, stationary outer casing forms a space within for the purpose of combustion, the space having an inlet for admission of oxidising agent and an outlet towards which oxidising agent travels. The specific dimensions of the outer casing will be condition and input dependent and this invention does not limit the dimensions to any specific range, however the spacing is constructed to ensure high velocities of oxidising agent through the combustor through calculation of cross sectional area and enough residence time for complete combustion of the fuel through calculation of longitudinal size. Oxidising agent passes axially along the inside of the combustor preferably at high velocities (>50 m/s), well above the room temperature flame speed of the fuel, having been injected at the inlet. As the temperature of the oxidising agent is preferably above the auto-ignition point of the fuel, combustion occurs immediately upon contact between fuel and the oxidising agent.

Fuel is delivered via fuel lines (either single or numerous). The fuel lines are split by a selection of manifolds and/or T-junctions or other fittings to form a three dimensional matrix of fuel injection pipelines running perpendicular to the flow of oxidising agent.

As an example, in one preferred embodiment the fuel lines may reside outside of the combustion chamber and extend in a direction parallel to the flow of the oxidising agent, and may have fuel inlet pipelines branching off them and in fluid communication with them in a perpendicular direction, and these fuel inlet pipelines may have fuel injection pipelines moving in a direction perpendicular both to the fuel lines and the fuel inlet pipelines, such that the fuel injection pipelines go through the outer casing, through a wall of the combustion chamber, across the combustion chamber, through the opposite wall of the combustion chamber, back through the outer casing, and into a fuel injection pipeline on the opposite side of the combustion chamber.

Since the section of fuel injection pipeline which is within the combustion chamber is exposed to the flow of oxidising agent, the fuel flowing through it is pre-heated by the passing oxidising agent. This is advantageous in the cases of fuels requiring pre-heating, and in fact the fuel injection pipelines can be sized to provide sufficient heat transfer for this process. Should the fuel be a liquid such automotive petrol or other liquid fuels, fuel injection nozzles well known to those skilled in the art can be used attached to the fuel distribution pipes, or such fuel can be vaporised prior to injection.

The fuel is thus injected at fuel injectors (such as, but not limited to, holes or nozzles). Preferably, the fuel injectors are oriented towards the outlet of the combustion chamber. The result of this is that the fuel will be injected in the direction of flow of the oxidising agent.

The fuel injection pipelines are preferably distributed in such a way to form idealised mixing of fuel and oxidising agent. Typically this will mean that the fuel injectors are evenly distributed throughout the combustion chamber. At each fuel injector the air-fuel ratio (AFR) will depend on the flow of oxidation agent at that point in the combustion chamber, the extent to which the oxidation agent has been depleted by combustion reactions prior to reaching the fuel injector, and the rate at which fuel is ejected from the fuel injector. (This last factor may be controlled by suitable adjustments to the geometry of the fuel lines and associated fuel inlet pipelines, fuel injection pipelines or other manifold elements.)

Under preferable, ideal conditions, the flow of the oxidation agent and the rate at which fuel is ejected from each fuel injector is controlled such that the AFR in the vicinity of each fuel injector is approximately the same.

The global AFR for the combustion chamber as a whole is given by the equation:

$$AFR_{global} = X/Y$$

Where X is the total air/oxidising agent mass flow and Y is the total fuel mass flow. Preferably, each fuel injector establishes in its vicinity a local AFR equivalent to the global AFR:

$$AFR_{local} = x_i / y_i$$

$$AFR_{local} = AFR_{global}$$

$$X / Y = x_i / y_i$$

$$\sum_{i}^{n} x_i = X$$

$$\sum_{i}^{n} y_i = Y$$

Where $x_i$ is the local oxidising agent supply to fuel injector i, $y_i$ is the associated fuel injected for fuel injector i, and the number of fuel injectors is characterised by a number n, suitable for the specific fuel type and combustion chamber geometry. Each local oxidising agent supply is not physically partitioned from each local fuel supply, rather the fuel injectors are positioned such that each fuel injector receives the correct oxidising agent supply according to the axial flow associated with the cross-sectional area encompassed by that fuel injector.

In a preferred embodiment fuel injection pipelines and fuel injectors are sized so nominally equal mass flows of fuel are injected at each injection point. These therefore occupy a cross sectional area of the combustor such that nominally the same mass flow of oxidising agent is delivered to each injection location based on the flow distribution within the combustor. This fuel distribution system removes the requirement for a large fuel rich zone (such fuel-rich zones typically resulting in CO formation), and thus removes a large hot zone (such hot zones typically resulting in $NO_x$ formation). It also removes the requirement for liners and dilution air. The fuel injection pipelines are a suitably small diameter and located in more than one longitudinal planes as to reduce blockage of the overall flow of the oxidising agent in any one longitudinal plane.

Preferably, the fuel injectors are sized such that fuel is injected at a greater absolute velocity than the oxidising agent flow (nominally 2-3 times) whilst ensuring a Mach number suitably below 1. The high characteristic velocities and the large differential velocities between fuel and oxidising agent ensure that the reactants are removed from the local reaction zone before the combustion reaction finishes, therefore establishing a DRZ. Due to a DRZ being established there is no spike in temperature (such spikes being associated with elevated $NO_x$ formation) and temperatures do not reach higher levels than the pre-calculated temperatures based on the AFR.

As the oxidising agent passes over fuel injection pipelines von Karman shedding may occur. Von Karman streets occurring downstream of the fuel injectors aid the high velocity local mixing of fuel and oxidising agent; the aid in mixing where von Karmen streets occur ensure no fuel rich locations, thus removing the possibility of hotspots and temperature spikes and enhancing the DRZ. The preferred combination of evenly distributed fuel injectors globally throughout the combustor and excellent local mixing (possibly aided by von Karman shedding) means that the oxidising agent and fuel are excellently mixed immediately post combustion without complicated mixing geometries, baffles or post combustion dilution air injection. This means pressure drop can be kept very low despite the high velocities associated with the combustor.

Fuel injectors and fuel injection pipelines are preferably spaced such that von Karmen streets, should the occur, do not impinge. The exact geometry of the fuel injection pipelines and exact location of the fuel injectors is input dependent and this invention does not limit the dimensions to any specific range. The fuel lines, fuel injection pipelines, and any fuel inlet pipelines, manifolds, or other components of the fuel delivery apparatus are cooled by the fuel flow through and can therefore be constructed from a suitable high nickel alloy or high temperature resistant steel, therefore allowing for complex fuel injection geometries. In addition a thermal barrier coating, well known to those skilled in the art, can be applied to the combustor zone contact region of the pipes to protect the pipes from corrosion and radiation.

Preferably, the combustion chamber and fuel injector geometry results in immediately mixed combustion gases with a nominally linear temperature increase from the inlet oxidising agent temperature to the desired outlet temperature without temperature peaks. The combustion chamber is preferably sized such that enough residence time for complete combustion is allowed downstream of all fuel injection ports. Combustion gases can then pass to the outlet, typically for use with gas turbines.

As mentioned, prior art flame-based combustor systems typically use their oxidising agent as a coolant to a liner as it bypasses the main reaction zone to be added through dilution holes. The liner is typically a thin metal casing separating the combustion zone from dilution air that passes through the liner holes to dilute the combustion gases. If the oxidising agent is too hot it no longer acts to cool the liner, hence metals are not suitable for liner construction and the geometry of liners is typically too complicated to manufacture from ceramics in such systems.

By comparison, the combustor of the present invention differs from typical flameless combustors in that it has higher velocities and does not require catalysts or premixing of fuel and oxidiser, and does not require the recirculation of combustion gases either internal or external to the combustor. The conditions of flameless combustion can be achieved without the need for recirculation of combustion gases to reduce the concentration of oxidising agent in the reaction zone. Velocities of both fuel and oxidiser flow are sufficiently high to form a DRZ and the arrangement of fuel distribution lines remove the requirement for mixing of reacted gases post combustion zone.

Optionally, mixing of fuel and air can be increased by including "humps" within the combustor void as depicted in FIG. 6. FIG. 6 depicts, in greatly simplified form, the combustion chamber with the direction of air flow 102 indicated. The plane at which the fuel injectors are arranged is depicted as the line 104. It will be seen that the humps 106 are positioned after the plane of fuel injection, but actually come before the combustion zone 108. The humps 106 have the effect of constricting the cross sectional area of the combustion chamber, and thus accelerating the flow of air and fuel through the chamber and forcing extra mixing of fuel and air by enhancing the flow turbulence. This speeds up the distribution of the injected fuel, further preventing the formation of high fuel-rich zones. It also destabilizes the air-fuel stream such that a stable flame cannot be formed. The humps are tailed off as to allow proper diffusion of the flow to reduce pressure drop.

Combustors of the type described above and below will result in reduced $NO_x$ and CO formation due to a number of different factors. The excellent mixing of oxidiser and fuel reduces the tendency for hot zones in the combusted fluid such that thermal $NO_x$ formation will be reduced. (This allows high temperature oxidising agents to be used.) Additionally, excellent mixing and flameless combustion results in no specific fuel-rich locations, thus resulting in low CO and low prompt $NO_x$ formation. As the combustor does not need cooling fluid, recuperated air can be used as the oxidising agent—this means the AFR ratio can be selected to provide the desired final temperature. This also reduces prompt $NO_x$ formation and CO formation by providing sufficient oxygen for complete, rapid oxidation.

Since fluid and combustion temperature during operation of the combustor depends on the location and geometry of the fuel injectors, it is possible to produce bespoke combustors for particular applications, selecting the arrangement of the fuel injectors based on the geometry of the combustion chamber and the intended purpose of the combustor such that the fluid and combustion temperature under operating conditions can be optimised. Through this means even with recuperated air the fluid temperature can be controlled by providing an approximate axially smooth heat distribution. Advantageously, this means that fluid temperatures can be kept well below typical $NO_x$ formation temperatures. The control of combustion temperatures and the use of recuperated air means that the temperature of the fluid can be kept sufficiently high, allowing rapid oxidation of CO.

Consequently, under preferable conditions the peak and average fluid temperature in the combustion chamber can be maintained during combustor operation within an optimal range, in which the temperature is low enough to avoid $NO_x$ formation (<~1500° C.) and high enough to ensure rapid CO oxidation (>~800° C.).

Optionally, the combustor can incorporate a separate chamber to initiate conventional combustion at lower speeds. This is to begin combustion during the start-up process, which otherwise would not initially provide pre-heated air. Optionally the air can be pre-heated during the start-up process by suitable electric heaters well known to those skilled in the art, for example using silicon carbide heating elements.

The combustor has the ability to use a multitude of fuels with a wide range of calorific values using the same basic geometric configuration with minor changes to fuel inlet pipe dimensions. Both liquid and gaseous fuels can be utilised, including but not limited to, hydrogen, biomethane, other biogas mixtures, landfill gas, natural gas, kerosene and petroleum mixtures such as automotive petrol (gasoline).

Pipelines (such as the fuel lines, fuel inlet pipelines and fuel injection pipelines) for delivering fuel to combustors according to the present invention may preferably be made of stainless steel tubing, since no particularly complex geometry is required. Combustors according to the present invention are able to handle extremely high temperature and high velocity oxidation agents (in excess of 800° C. and 50 m/s at the inlet).

An example of the present invention is depicted in the figures. The particular example illustrated is intended for use as part of a gas turbine cycle. FIG. 1 depicts a perspective view of the combustor system. The outer casing 8 contains a combustion chamber 2. In the embodiment depicted, the outer casing 8 comprises multiple layers of insulation materials selected to insulate and contain the temperature, with the outermost layer being metal; the specific materials and dimensions chosen are based on a specific temperature gradient through the layer such that an outer casing shows a desired surface temperature. Materials used for insulation could be, but are not limited to, microporous, castable refractory, cordierite, structural calcium silicate and ceramic fiber products. The outlet 6 towards which oxidising agent flows in operation is visible; the inlet is on the opposite side. Alongside the casing 8, extending in a direction parallel to the longitudinal axis of the combustion chamber 2, are fuel lines 12. Extending from the fuel lines 12 in a direction perpendicular to them are fuel inlet pipelines 14. Extending from the fuel inlet pipelines 14 in a direction perpendicular to them and to the fuel lines 12, and intersecting the combustion chamber 2, are fuel injection pipelines 16.

Figure 2:
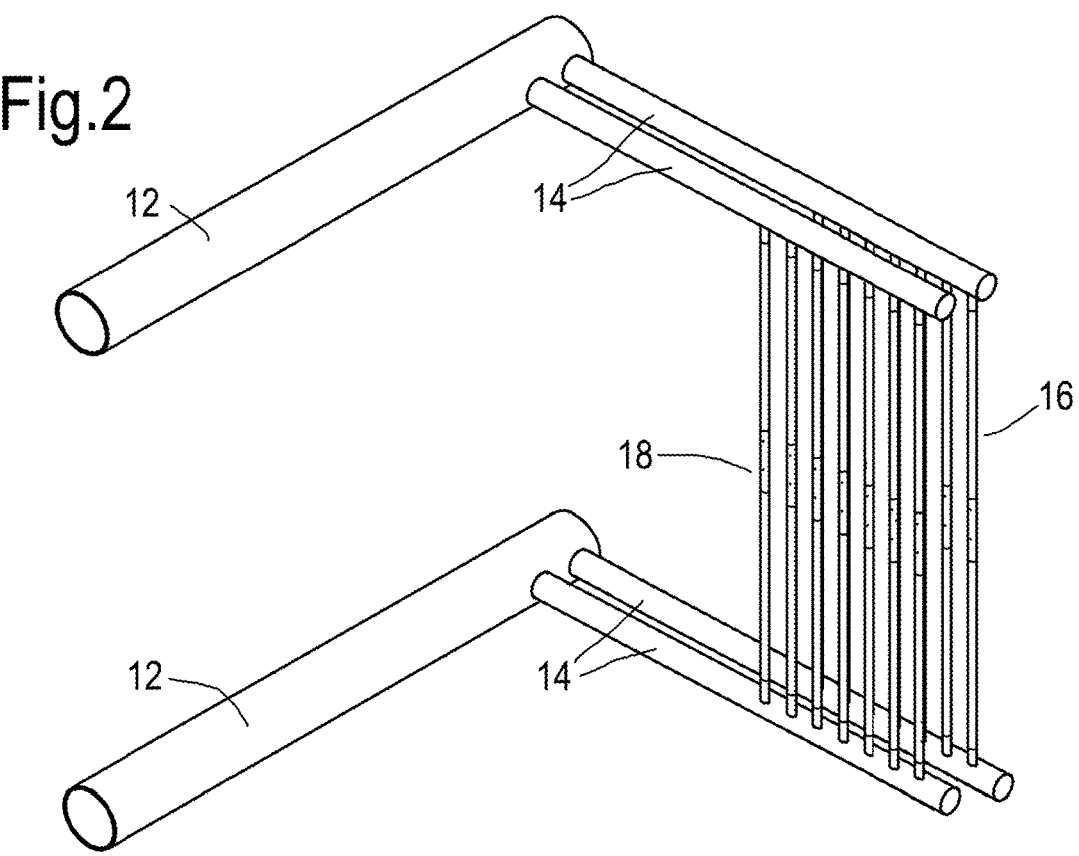
FIGS. 2 and 3 provides a perspective view of the fuel pipelines of the combustor system of FIGS. 1 and 4.

FIG. 2 depicts just the fuel pipelines of the same combustor system, to better illustrate their arrangement. It will be evident from the figure that the fuel injection pipelines 16 extend from one fuel inlet pipeline 14 to a corresponding one on the opposite side of the combustion chamber. The fuel injection pipelines 16 also incorporate fuel injectors 18. These are oriented to face towards the outlet 6.

Figure 3:
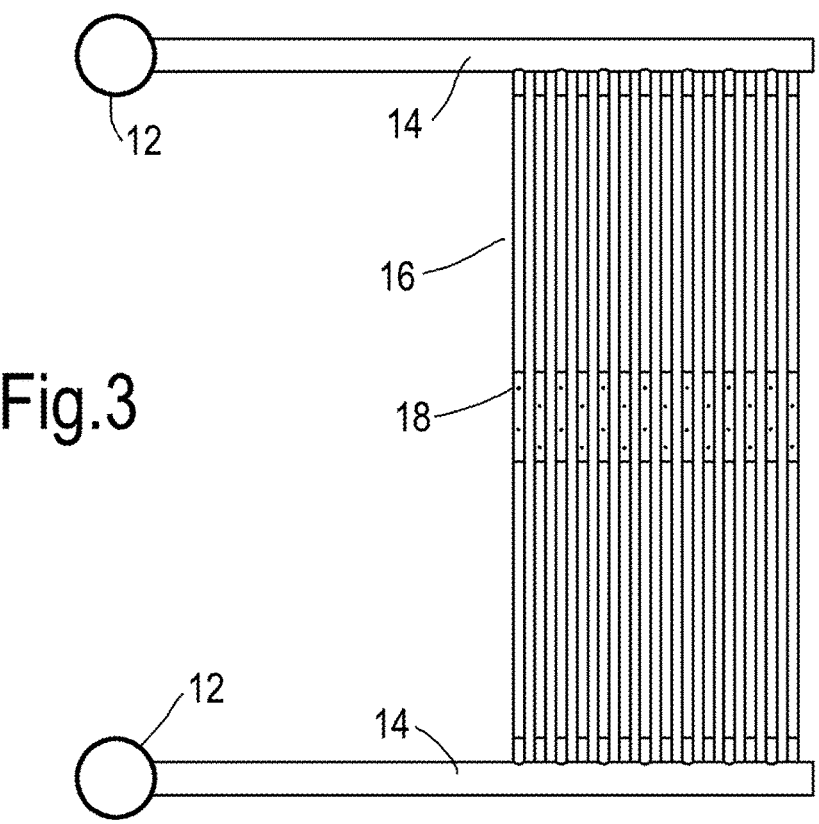

FIG. 3 depicts the fuel pipelines, with the view oriented such that the direction of flow of oxidising agent when the combustor is in use is out of the page towards the viewer. As seen in FIG. 2, each pair of fuel inlet pipelines 14 has six fuel injection pipelines 16 connecting them, and the fuel injection pipelines 16 are staggered in the direction of extension of the fuel inlet pipelines 14, and the injectors 18 are staggered on the fuel injection pipelines 16, so as to ensure as even as possible a distribution of injectors 18. It will be evident that whilst the depicted example has two injectors 18 per fuel injection pipeline 16, they could have as few as one or as many injectors 18 as the geometry of the combustion chamber 2 makes necessary.

Figure 4:
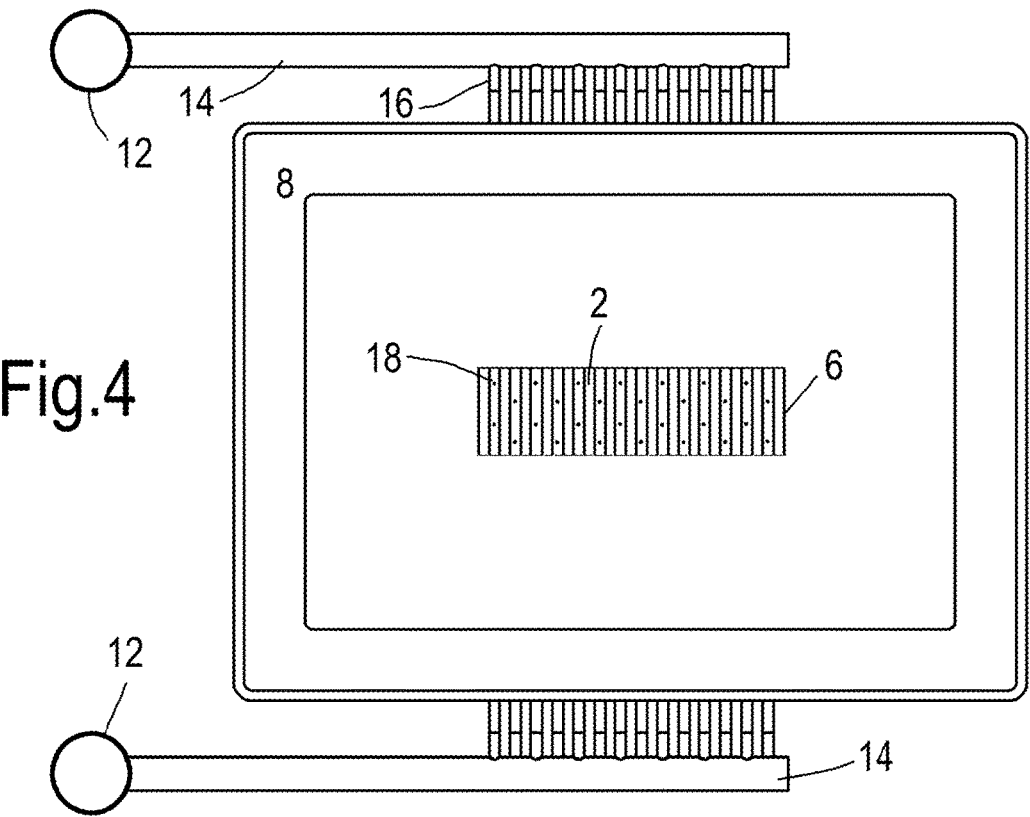

FIG. 4 depicts the combustor system oriented in the same direction as FIG. 3 to show how the injectors 18 are arranged within the combustion chamber 2.

Though for the purpose of illustrating the present invention the figures show only two pairs of fuel inlet pipelines 14 (with associated fuel injection pipelines 16) extending from the fuel lines 12, it will be appreciated that for the purposes of the present invention additional pairs can be incorporated along the length of the fuel line 12, preferably as many as is required to establish a consistent air fuel ratio throughout the combustion chamber 2.

FIG. 5 depicts the results of tests of a combustor according to the present invention. The hot flow input to the combustor was provided by a burner and enriched to 21% oxygen, rather than ambient fresh air being used; as such, there was a certain level of $NO_x$ at the inlet. The depicted results show the difference in ppm in CO content and $NO_x$ content—defined as the total content of NO, $NO_2$ and $N_2O$ in ppm—between the inlet and outlet of the combustor. Measurements were taken using a Fourier Transform Infrared spectrometer readings (FTIR spectroscopy) prior to the gases entering the flameless combustor and after the gases exited the flameless combustor. It will be seen that the amount that the combustor adds minimal levels of these exhaust gases; less than 3 ppm of $NO_x$, less than 2 ppm of CO, and indeed in some test runs there was an apparent decrease in CO (owing to the levels of CO being extremely small in comparison to the level of uncertainty in the measurements).

This extremely minimal level of CO and $NO_x$ emission compares very favourably with regulatory requirements and with prior art solutions. US EPA regulations as of 2005 require that natural gas burners must have $NO_x$ production levels of 30 ppm or below, and gas turbine combustors must achieve less than 25 ppm $NO_x$ production if running at a production capacity below 50 MW. Within the industry, attaining less than 15 ppm $NO_x$ or 30 ppm CO is considered to be worth touting in promoting burner systems. It is evident that the present invention's extremely low levels of production of these species constitutes a major technical contribution.

Optionally, combustors according to the present invention can be part of a regenerative turbine cycle which can involve a compressor for the inlet air, a rotating regenerator or heat exchanging recuperator to transfer heat from the turbine exhaust to the compressed air, a combustor herein described to raise the temperature of the compressed air to the desired turbine inlet conditions and a turbine to extract work from the high temperature compressed air. The rotating regenerator ort heat exchanging recuperator would deliver air to the combustor described herein at temperatures above autoignition temperature of the fuel while exhibiting low pressure (and carryover) losses throughout the unit and would therefore need to be a high temperature, high effectiveness heat exchanger. The turbine would accept high temperature air from the combustor and therefore would have to be constructed from suitable materials to deal with high temperature inlet air, such a turbine may require relatively low rotational speeds based on the material specification. A compressor for the inlet air could be a high efficiency compressor capable of being shaft driving by the turbine and therefore would be capable of compressing the air at low rotational speeds. Such a cycle including the combustor is capable of high efficiencies compared to other micro-turbine cycles.

The invention claimed is:

1. A flameless combustor system comprising:
   a combustion chamber extending longitudinally through which an oxidising agent flows in the longitudinal direction from an inlet to an outlet, and
   at least two fuel lines;
   wherein at least one fuel injection pipeline in fluid communication with a first of the at least two fuel lines extends through a wall of the combustion chamber, wherein each fuel injection pipeline contains at least one fuel injector for injecting fuel into the combustion chamber;
   characterised in that at least one of the at least one fuel injection pipelines extends through the wall of the combustion chamber, across the interior of the combustion chamber to an opposite wall of the combustion chamber, and through the opposite wall, such that the fuel injection pipeline is in fluid communication with both the first of the at least two fuel lines and a second of the at least two fuel lines.

2. The flameless combustor system of claim 1, wherein each of the at least two fuel lines has extending from it at least one fuel inlet pipeline in fluid communication with the fuel line and at least one of the at least one fuel injection pipelines extends from the fuel inlet pipeline, such that the fuel injection pipeline is in fluid communication with the fuel inlet pipeline.

3. The flameless combustor system of claim 1, wherein the at least two fuel lines extend substantially parallel to the combustion chamber in the longitudinal direction.

4. The flameless combustor system of claim 3, wherein the at least one fuel injection pipelines extend in a direction perpendicular to that of the at least two fuel lines.

5. The flameless combustor system of claim 4, each of the at least two fuel lines has extending from it at least one fuel inlet pipeline in fluid communication with the fuel line and at least one of the at least one fuel injection pipelines extends from at least one of the at least one fuel inlet pipelines, such that the fuel injection pipelines is in fluid communication with the fuel inlet pipelines, and wherein the fuel inlet pipelines extend in a direction perpendicular to that of the at least two fuel lines and of the at least one fuel injection pipelines.

6. The flameless combustor system of claim 1, wherein each of the at least two fuel lines comprises a plurality of fuel inlet pipelines extending from it along its length, and each fuel inlet pipeline comprises a plurality of fuel injection pipelines extending from them along their lengths.

7. The flameless combustor system of claim 1, wherein the fuel injectors comprise holes or nozzles.

8. The flameless combustor system of claim 7, wherein the holes or nozzles have a size selected to determine the velocity of fuel ejected from the holes or nozzles under operational conditions.

9. The flameless combustor system of claim 1, wherein the fuel injectors are oriented towards the outlet of the combustion chamber.

10. The flameless combustor system of claim 1, wherein the diameters of the at least two fuel lines, at least one fuel injection line, and (where present) at least one fuel inlet pipelines are chosen such that under operational conditions the pressure of fuel delivered to each injection point is the same.

11. The flameless combustor system of claim 1, wherein fuel injectors are evenly distributed within the combustion chamber.

12. A method of utilising a flameless combustor system according to claim 1, wherein oxidising agent is provided through the inlet and fuel is admitted into the at least two fuel lines such that the fuel will pass into the at least one fuel injection pipelines and be expelled through the at least one fuel injectors, with the velocity and pressure of the oxidising agent and fuel selected so as to establish the same air-fuel ratio at each of the at least one fuel injectors.

13. The method of claim 12, wherein the air-fuel ratio is selected such that the combustion chamber maintains a temperature below that which would cause $NO_x$ formation under operational conditions.

14. The method of claim 12, wherein the combustion chamber maintains a temperature between 800° C. and 1500° C.

* * * * *